United States Patent [19]

DiSalvatore

[11] Patent Number: 4,941,638
[45] Date of Patent: Jul. 17, 1990

[54] BLIND SPOT MIRROR

[76] Inventor: Albert G. DiSalvatore, 1702 E. 45 St., Ashtabula, Ohio 44004

[21] Appl. No.: 276,130

[22] Filed: Nov. 25, 1988

[51] Int. Cl.⁵ .................................................. G02B 5/08
[52] U.S. Cl. ..................................... 248/481; 248/467; 350/632
[58] Field of Search ................ 248/467, 481–484, 248/288.3; 350/632, 626; 403/125, 122

[56] References Cited

U.S. PATENT DOCUMENTS

| 918,724 | 4/1909 | Austin | 248/467 |
| 2,146,859 | 2/1939 | Seklehner | 248/467 |
| 3,498,579 | 3/1970 | Vicary | 248/483 |
| 4,293,191 | 10/1981 | Kim | 248/467 X |
| 4,445,163 | 4/1984 | Ziaylek, Jr. | 248/288.3 X |
| 4,526,446 | 7/1985 | Adams | 350/632 X |
| 4,565,345 | 1/1986 | Templeman | 248/481 |

FOREIGN PATENT DOCUMENTS 1096463  12/1967  United Kingdom ............... 248/481

Primary Examiner—Alvin C. Chin-Shue
Attorney, Agent, or Firm—Ralph Hammar

[57] ABSTRACT

A blind spot mirror to be adhesively mounted on an inner surface of a windshield. The mirror is mounted on a flat surface on a friction ball which is part of a ball joint for adjusting the mirror.

5 Claims, 1 Drawing Sheet

BLIND SPOT MIRROR

This is a rear view mirror which is intended to eliminate the blind spot in which nearby automobiles cannot be seen by the driver.

Figure 1:
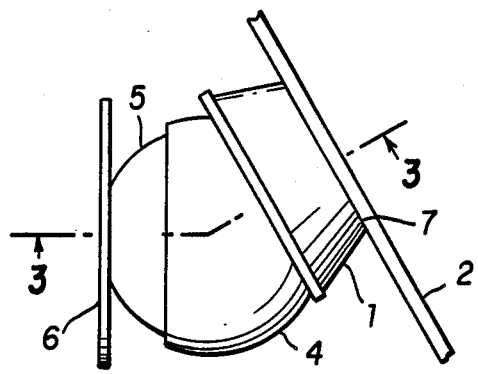
FIG. 1 is a side elevation of the blind spot mirror.
Figure 2:
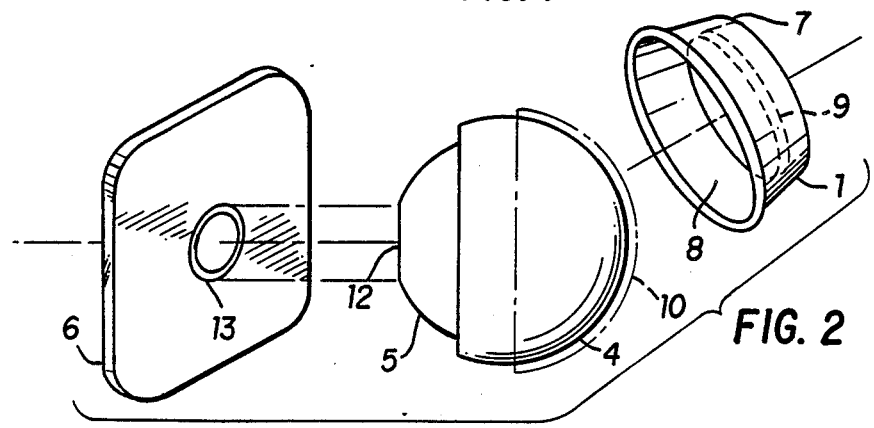
FIG. 2 is an exploded view.
Figure 3:
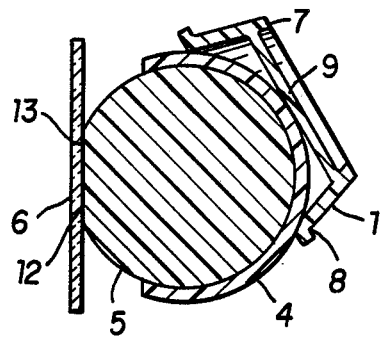
FIG. 3 is a section on line 3—3 of FIG. 1.

The blind spot mirror has a base 1 to be mounted in an upper part of a windshield 2, usually in a corner near the driver, and a ball joint 3 consisting of a frustum of a spherical shell 4 to be mounted on the base and a friction ball 5 mounted in the shell and carrying a mirror 6. The base has an adhesive coated annular surface 7 engaging the windshield 2 and an outwardly projecting concave annular surface 8 engaging the exterior surface of the shell 4. The shell has an adhesive coated convex exterior surface 10 engaging the concave surface 7 and the bottom wall 9 of the base. The clearance between the wall 9 and the windshield 2 permits tight engagement of the adhesive coated surface of the base and shell to hold the shell 4 in fixed relation to the base 1 with the shell 4 seated on the concave surface 8. The ball 5 has a flat face 12 coated with adhesive which engages the rear face 13 of the flat mirror 6. The adhesive coated surfaces are protected by release paper so that before the parts are cemented together, the parts can be assembled in the desired relation to check the field of vision of the mirror in various positions on the windshield. When the desired position has been selected in order to give the driver the best view of the blind spot area, the release paper on surface 7 of the base is removed and the base is attached to the windshield; then the release paper on the shell is removed and the shell is inserted in the base which fixes the shell to the base in a fixed position. The release paper is then removed from the adhesive coating on the flat face 12 of the ball and the surface 13 of the mirror and the mirror attached to the ball.

The ball projects beyond the shell a sufficient distance to allow about a 15 to 30 degree of tilt of the mirror in all directions. This is enough so that once the parts are assembled, tilting of the mirror relative to the shell and base will provide an adequate view of the blind spot for all drivers.

Impact resistant plastic is a preferred material for the base 1 and shell 4 and ball 5. A friction coating or tape is a preferred material for the ball 5.

I claim:

1. A blind spot flat mirror having a base mounted on and infixed relation to the inner surface of a windshield, typically on an inside upper corner of the windshield, said base having a seat receiving and fixed to an exterior convex surface of a frustum of a spherical hollow shell of a ball joint to compensate for the inclination of the windshield, a ball rotatably received in said shell for tilting movement through an acute angle relative to the shell in all directions, and a flat seat on said ball fixed to the back surface of a flat mirror.

2. The structure of claim 1 in which the base is fixed by adhesive to the windshield and to the shell and the flat seat of said ball is fixed to the back surface of the flat mirror by adhesive.

3. The structure of claim 2 in which the adhesive is of the pressure sensitive type protected from adhesion by release paper which permits assembling the parts in various positions to select the position affording the desired view of the blind spot area prior to fixing the parts together with adhesive joints.

4. In combination, an elongated flat rear view mirror fixed to a flat spot on a friction ball of diameter substantially the width of the mirror, a frustum of a hollow spherical shell receiving said ball and supporting said mirror for tilting in all directions relative to said shell, and means for mounting said shell in a fixed position to provide a blind spot view for a vehicle driver.

5. The structure of claim 4 in which the ball is a soft rubber ball.

* * * * *